(12) United States Patent
Iizuka et al.

(10) Patent No.: US 8,487,027 B2
(45) Date of Patent: *Jul. 16, 2013

(54) GOLF BALL MATERIAL AND METHOD OF PREPARING THE SAME

(75) Inventors: Kae Iizuka, Saitamaken (JP); Eiji Takehana, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 266 days.

This patent is subject to a terminal disclaimer.

(21) Appl. No.: 12/956,805

(22) Filed: Nov. 30, 2010

(65) Prior Publication Data

US 2011/0082243 A1  Apr. 7, 2011

Related U.S. Application Data

(63) Continuation-in-part of application No. 12/575,256, filed on Oct. 7, 2009, now abandoned.

(51) Int. Cl.
*C08L 33/02* (2006.01)
*C08K 5/09* (2006.01)
*A63B 37/00* (2006.01)

(52) U.S. Cl.
USPC ........... 524/322; 524/394; 524/399; 524/400; 525/195; 525/196; 525/221; 473/373; 473/385

(58) Field of Classification Search
None
See application file for complete search history.

(56) References Cited

U.S. PATENT DOCUMENTS

| | | | |
|---|---|---|---|
| 6,962,951 B1 * | 11/2005 | Takesue et al. | 524/322 |
| 7,273,903 B2 | 9/2007 | Chen | |
| 7,462,113 B2 | 12/2008 | Kim et al. | |
| 7,488,778 B2 | 2/2009 | Chen | |
| 8,008,392 B1 * | 8/2011 | Iizuka et al. | 524/522 |
| 2010/0069173 A1 * | 3/2010 | Okabe et al. | 473/372 |
| 2012/0029130 A1 * | 2/2012 | Iizuka et al. | 524/322 |
| 2012/0071272 A1 * | 3/2012 | Iizuka et al. | 473/373 |

* cited by examiner

*Primary Examiner* — David Buttner
(74) *Attorney, Agent, or Firm* — Sughrue Mion, PLLC

(57) ABSTRACT

The invention provides a golf ball material which is a resin mixture composed of (a) an olefin-unsaturated carboxylic acid copolymer and/or an olefin-unsaturated carboxylic acid-unsaturated carboxylic acid ester copolymer having a weight-average molecular weight (Mw) of from 40,000 to 80,000 and a weight-average molecular weight (Mw) to number-average molecular weight (Mn) ratio of from 5.0 to 8.0, or a metal neutralization product thereof, (b) an olefin-unsaturated carboxylic acid copolymer and/or an olefin-unsaturated carboxylic acid-unsaturated carboxylic acid ester copolymer having a weight-average molecular weight (Mw) of from 120,000 to 200,000 and a weight-average molecular weight (Mw) to number-average molecular weight (Mn) ratio of from 6.0 to 9.5, or a metal neutralization product thereof, (c) an organic acid or a metal salt thereof, and (d) a basic inorganic metal compound for neutralizing at least 70 mol % of acid groups in components (a) to (c), which resin mixture has a Shore D hardness of from 30 to 50. The golf ball material of the invention is a low-hardness material. Golf balls in which an injection molding of the golf ball material is used as a cover material have an excellent rebound and durability.

10 Claims, No Drawings

GOLF BALL MATERIAL AND METHOD OF PREPARING THE SAME

CROSS-REFERENCE TO RELATED APPLICATION

This application is a continuation-in-part of application Ser. No. 12/575,256 filed on Oct. 7, 2009, now abandoned, the entire contents of which are hereby incorporated by reference.

BACKGROUND OF THE INVENTION

The present invention relates to a golf ball material which is suitable for use as a cover material in golf balls, has good flow properties and moldability, and endows the golf ball with an excellent rebound resilience and durability even when the material hardness is low. The invention also relates to a method of preparing such a golf ball material.

Ionomers are conventionally used in golf balls. Approaches being carried out recently to achieve a higher ball rebound in particular include methods that involve blending ionomers together, methods in which other thermoplastic resins and additives are blended together with an ionomer, and methods that increase the degree of neutralization of an ionomer itself.

Among methods that involve blending ionomers together, a number of techniques which use two types of ionomers having different weight-average molecular weights have been proposed. For example, U.S. Pat. No. 7,462,113 discloses the use in a cover material of a ternary ionomer having a weight-average molecular weight of from 80,000 to 500,000 in combination with a ternary ionomer having a weight-average molecular weight of from 2,000 to 30,000. Also, U.S. Pat. Nos. 7,273,903 and 7,488,778 describe blending together, as a cover material: a ternary ionomer having a weight-average molecular weight of from 80,000 to 500,000, a binary ionomer having a weight-average molecular weight of from 2,000 to 30,000, and an optional thermoplastic elastomer.

However, the above proposed ionomer blending techniques all use resins (ionomers) that have been neutralized beforehand with metal ions, resulting in a lower degree of freedom in blend design—such as the types of metal ions, the blending amounts, and the degrees of neutralization—which has made it difficult to achieve the desired properties.

When use is made of a highly neutralized material in which the degree of ionomer neutralization has been increased, such a material tends to have a higher hardness, as a result of which the rebound resilience of the material has a tendency to increase. Conversely, efforts to lower the hardness of a highly neutralized ionomer lead to a diminution of the high rebound resilience characteristic of highly neutralized ionomeric materials, which poses a challenge. Recently, various art has been disclosed which, by softening the cover material used in a golf ball, improves the feel of the ball upon impact and also increases the spin rate on approach shots, thus enhancing the controllability. However, when the cover is soft, the ball has a poor rebound and a spin rate-lowering effect cannot be achieved, as a result of which the ball tends to travel a shorter distance.

Accordingly, there exists a desire for, in cases where a highly neutralized ionomeric material with the advantage of having a high degree of freedom in blend design is used as the cover material, a golf ball material which enables a high golf ball rebound and durability to be retained even when the material hardness is low.

SUMMARY OF THE INVENTION

It is therefore an object of the present invention to provide a golf ball material which has a low material hardness and which, when shaped by injection molding and used as a golf ball cover, endows the golf ball with excellent rebound and durability. Another object of the invention is to provide a method for preparing such a golf ball material.

As a result of extensive investigations, the inventors, in preparing ionomeric resin compositions having a low Shore D hardness of from 30 to 50, focused on the weight-average molecular weight (Mw) and weight-average molecular weight (Mw)/number-average molecular weight (Mn) of the olefin-unsaturated carboxylic acid copolymer and/or olefin-unsaturated carboxylic acid-unsaturated carboxylic acid ester copolymer which serve as the base resin of an ionomer, blending two types of ionomers or the base resins thereof, then adding thereto an organic acid or a metal salt thereof, adding also a metal ionic species, and carrying out an acid neutralization reaction. The inventors discovered that golf balls in which the resulting resin compositions are injection-molded and used as, for example, a cover material, exhibit an unexpectedly outstanding rebound and durability in spite of the low hardness of the composition. This discovery ultimately led to the present invention.

Accordingly, the present invention provides the following golf ball material and method of preparation.

[1] A golf ball material which is a resin mixture comprising:
  (a) an olefin-unsaturated carboxylic acid copolymer and/or an olefin-unsaturated carboxylic acid-unsaturated carboxylic acid ester copolymer having a weight-average molecular weight (Mw) of from 40,000 to 80,000 and a weight-average molecular weight (Mw) to number-average molecular weight (Mn) ratio of from 5.0 to 8.0, or a metal neutralization product thereof,
  (b) an olefin-unsaturated carboxylic acid copolymer and/or an olefin-unsaturated carboxylic acid-unsaturated carboxylic acid ester copolymer having a weight-average molecular weight (Mw) of from 120,000 to 200,000 and a weight-average molecular weight (Mw) to number-average molecular weight (Mn) ratio of from 6.0 to 9.5, or a metal neutralization product thereof,
  (c) an organic acid or a metal salt thereof, and
  (d) a basic inorganic metal compound for neutralizing at least 70 mol % of acid groups in components (a) to (c); wherein the resin mixture has a Shore D hardness of from 30 to 50.

[2] The golf ball material of [1] which has a mixing ratio by weight (a):(b) between component (a) and component (b) of from 10:90 to 70:30, and wherein component (c) is included in an amount of from 5 to 35 parts by weight per 100 parts by weight of components (a) and (b) combined.

[3] The golf ball material of [1], wherein the organic acid of component (c) is selected from the group consisting of stearic acid, oleic acid, and mixtures thereof.

[4] The golf ball material of [1], wherein the unsaturated carboxylic acid of components (a) and (b) is acrylic acid or methacrylic acid.

[5] A method of preparing a gold ball material, the method comprising the step of preparing the golf ball material of [1] using a single-screw extruder, a twin-screw extruder, or a tandem extruder thereof.

DETAILED DESCRIPTION OF THE INVENTION

The invention is described more fully below.

The golf ball material of the invention contains as the base resins: (a) an olefin-unsaturated carboxylic acid copolymer and/or an olefin-unsaturated carboxylic acid-unsaturated carboxylic acid ester copolymer having a weight-average molecular weight (Mw) of from 40,000 to 80,000 and a weight-average molecular weight (Mw) to number-average molecular weight (Mn) ratio of from 5.0 to 8.0, or a metal neutralization product thereof, and (b) an olefin-unsaturated carboxylic acid copolymer and/or an olefin-unsaturated carboxylic acid-unsaturated carboxylic acid ester copolymer having a weight-average molecular weight (Mw) of from 120,000 to 200,000 and a weight-average molecular weight (Mw) to number-average molecular weight (Mn) ratio of from 6.0 to 9.5, or a metal neutralization product thereof.

The weight-average molecular weight (Mw) of above component (a) is from 40,000 to 80,000, and preferably from 45,000 to 70,000. The weight-average molecular weight (Mw) to number-average molecular weight (Mn) ratio is from 5.0 to 8.0, and preferably from 5.5 to 7.0.

The weight-average molecular weight (Mw) of component (b) is from 120,000 to 200,000, and preferably from 120,000 to 180,000. The weight-average molecular weight (Mw) to number-average molecular weight (Mn) ratio is from 6.0 to 9.5, preferably from 6.1 to 9.0, and more preferably from 6.1 to 8.5.

When the above two types of resin components (a) and (b) of differing average molecular weights and differing molecular weight distributions (Mw/Mn) are blended in this way, the low-molecular-weight and high-molecular-weight polymers complexly intertwine, giving rise to molecular synergistic effects. By additionally increasing the degree of neutralization thereof, even when the resin mixture has a low hardness, it is possible to achieve a high ball rebound and durability.

The weight-average molecular weight (Mw) and the number-average molecular weight (Mn) are values calculated relative to polystyrene in gel permeation chromatography (GPC). A word of explanation is needed here concerning GPC molecular weight measurement. It is not possible to directly take GPC measurements for binary copolymers and ternary copolymers because these molecules are absorbed to the GPC column owing to the unsaturated carboxylic acid groups within the molecule. Instead, the unsaturated carboxylic acid groups are generally converted to esters, following which GPC measurement is carried out and the polystyrene-equivalent average molecular weights Mw and Mn are calculated.

The olefin used in above component (a) or (b) preferably has from 2 to 6 carbons, and is most preferably ethylene. The unsaturated carboxylic acid used in component (a) or (b) is exemplified by acrylic acid (AA) and methacrylic acid (MAA), although the use of methacrylic acid (MAA) is especially preferred. The unsaturated carboxylic acid ester used in component (a) or (b) is preferably a lower alkyl ester, and most preferably butyl acrylate (n-butyl acrylate, i-butyl acrylate).

The unsaturated carboxylic acid content (acid content) in component (a) or (b), while not subject to any particular limitation, is in a range of preferably at least about 2 wt but not more than about 15 wt %, and more preferably at least about 2 wt % but not more than about 12 wt %. If the acid content is lower than this range, moldings of the golf ball material may not be able to achieve a good rebound. On the other hand, if the acid content is too high, such moldings may become excessively hard, adversely affecting the durability.

In this invention, it is essential to use component (a) and component (b) together. The mixing ratio by weight (a):(b) between component (a) and component (b) is preferably from 10:90 to 70:30, and more preferably from 10:90 to 60:40. If the proportion of component (b) is higher than the above range, the hardness may increase and the material may become difficult to mold.

In cases where the metal neutralization products of resins (i.e., ionomers) are used as component (a) and component (b), the type of metal neutralization product and the degree of neutralization are not subject to any particular limitation. Illustrative examples include 60 mol % zinc (degree of neutralization with zinc) ethylene-methacrylic acid copolymers, 40 mol % magnesium (degree of neutralization with magnesium) ethylene-methacrylic acid copolymers, and 40 mol % magnesium (degree of neutralization with magnesium) ethylene-methacrylic acid-isobutylene acrylate terpolymers.

In the present invention, it is especially preferable to use as component (a) and component (b) an un-neutralized olefin-unsaturated carboxylic acid copolymer and/or an un-neutralized olefin-unsaturated carboxylic acid-unsaturated carboxylic acid ester copolymer.

As mentioned above, copolymers or ionomers having a weight-average molecular weight (Mw) and a molecular weight distribution breadth (U=Mw/Mn) set within specific ranges are used as components (a) and (b). For example, use may be made of commercial products from the Nucrel series (produced by DuPont-Mitsui Polychemicals Co., Ltd.) or the Escor series (produced by ExxonMobil Chemical).

The organic acid or metal salt thereof serving as component (c), while not subject to any particular limitation, is preferably one or more selected from the group consisting of stearic acid, behenic acid, oleic acid, maleic acid and metal salts thereof. One selected from the group consisting of stearic acid, oleic acid and mixtures thereof is especially preferred. The organic acid metal salt of component (c) is preferably a metallic soap. The metal salt makes use of metal ions having a valence of from 1 to 3 which are preferably selected from the group consisting of lithium, sodium, magnesium, aluminum, potassium, calcium and zinc. A metal salt of stearic acid is especially preferred. Specifically, the use of magnesium stearate, calcium stearate, zinc stearate or sodium stearate is preferred. Of these, the use of magnesium stearate is especially preferred.

Component (c) is included in an amount, per 100 parts by weight of components (a) and (b) as the base resins, of preferably from 5 to 35 parts by weight, and more preferably from 10 to 28 parts by weight. If component (c) is included in too small an amount, lowering the hardness of the resin material will be difficult. Conversely, too much component (c) will make the resin material difficult to mold and will increase bleeding at the material surface, affecting the molded article.

Illustrative examples of the metal ions in the basic inorganic metal compound of above component (d) include $Na^+$, $K^+$, $Li^+$, $Zn^{2+}$, $Ca^{2+}$, $Mg^{2+}$, $Cu^{2+}$ and $Co^{2+}$. Of these, $Na^+$, $Ca^{2+}$ and $Mg^{2+}$ are preferred, and $Mg^{2+}$ is especially preferred. These metal salts may be introduced into the resin using, for example, formates, acetates, nitrates, carbonates, bicarbonates, oxides or hydroxides.

The basic inorganic metal compound of (d) above is a component for neutralizing acid groups in above components (a) to (c). The amount of component (d) included is set to at least 70 mol %, based on the acid groups in above components (a) to (c). Here, the amount in which the basic inorganic metal compound of component (d) is included may be selected as appropriate for obtaining the desired degree of neutralization. Although this amount depends also on the degree of neutralization of components (a) and (b) that are used, in general it is preferably from 0.5 to 10 parts by weight, and more preferably from 1 to 5 parts by weight, per 100 parts by weight of components (a) and (b) combined. The degree of neutralization of acid groups in above components (a) to (c) must be at least 70 mol %, and is preferably at least 90 mol %, and more preferably at least 100 mol %.

The resin composition made up of above components (a) to (d) accounts for at least about 50 wt %, preferably at least about 60 wt %, more preferably at least about 70 wt %, and most preferably at least about 90 wt %, of the overall golf ball material.

The following thermoplastic resins may be included in the golf ball material of the invention, insofar as the objects of the invention are attainable. Illustrative, non-limiting, examples of thermoplastic resins that may be used include polyolefin elastomers (including polyolefins and metallocene polyolefins), polystyrene elastomers, diene polymers, polyacrylate polymers, polyamide elastomers, polyurethane elastomers, polyester elastomers and polyacetals.

In addition, the golf ball material of the invention may also include optional additives as appropriate for the intended use. For example, when the inventive golf ball material is to be used as a cover material, various additives such as pigments, dispersants, antioxidants, ultraviolet absorbers and light stabilizers may be added to above components (a) to (d). When such additives are included, they may be added in an amount of generally at least about 0.1 part by weight, and preferably at least about 0.5 part by weight, but generally not more than about 10 parts by weight, and preferably not more than about 4 parts by weight, per 100 parts by weight of above components (a) to (d) combined.

The melt flow rate (MFR) of the inventive golf ball material, as measured in accordance with JIS-K7210 at a test temperature of 190° C. and a test load of 21.18 N (2.16 kgf), is not subject to any particular limitation. However, to provide good flow properties and moldability at the time of injection molding, it is recommended that the melt flow rate be preferably at least about 3.0 g/10 min, more preferably at least about 3.5 g/10 min, and even more preferably at least about 4.0 g/10 min, but preferably not more than about 10.0 g/10 min, and more preferably not more than about 8.0 g/10 min.

Moldings obtained using the golf ball material of the invention have a Shore D hardness of at least 30, preferably at least 33, and more preferably at least 35, but not more than 50, and preferably not more than 48.

The method of preparing the golf ball material of the present invention is not subject to any particular limitation, although use may be made of a method which involves charging the ionomers or un-neutralized polymers of components (a) and (b), together with component (c) and component (d), into a hopper and extruding under the desired conditions. Alternatively, component (c) may be charged from a separate feeder. In this case, the neutralization reaction by above component (d) as the metal cation source with the carboxylic acids in components (a), (b) and (c) may be carried out by various types of extruders. The extruder may be either a single-screw extruder or a twin-screw extruder, although a twin-screw extruder is preferable. Alternatively, these extruders may be used in a tandem arrangement, such as single-screw extruder/twin-screw extruder or twin-screw extruder/twin-screw extruder. These extruders need not be of a special design; the use of existing extruders will suffice.

The golf ball material of the invention may be used as the material for a one-piece golf ball, or may be used as a cover material or an intermediate layer material in a two-piece solid golf ball composed of a core and a cover encasing the core or in a multi-piece solid golf ball composed of a core of at least one layer, one or more intermediate layer encasing the core, and a cover of at least one layer encasing the intermediate layer. In the case of multilayer golf balls composed of a core of at least one layer and a cover of at least two layers in particular, a golf ball of outstanding rebound and durability can be obtained when the core is formed of a rubber composition which includes cis-1,4-polybutadiene, an unsaturated carboxylic acid metal salt, an inorganic filler and an organic peroxide; the material of the present invention is used in an inner cover which is not the outermost cover layer; and a conventional ionomeric resin or a conventional polyurethane elastomer is used as the cover.

As described above, the golf ball material of the present invention is a highly neutralized ionomeric resin mixture in which two types of copolymers having weight-average molecular weights and molecular weight distribution breadths (weight-average molecular weight/number-average molecular weight) set within different specific ranges serve as the base resins to which is added an organic acid or a metal salt thereof, and a neutralizing basic inorganic metal compound. Golf balls in which an injection molding made from the inventive golf ball material is used as, for example, a cover material have an excellent rebound and durability in spite of the low hardness.

EXAMPLES

The following Examples and Comparative Examples are provided by way of illustration and not by way of limitation.

Examples 1 to 3 and Comparative Examples 1 to 3

Solid cores having a diameter of 37.50 mm and a weight of 32.80 g were obtained using a core material of the following formulation and composed primarily of cis-1,4-polybutadiene.

| Core Formulation | |
|---|---|
| cis-1,4-Polybutadiene | 100 parts by weight |
| Zinc oxide | 5 parts by weight |
| Barium sulfate | 15 parts by weight |
| Antioxidant | 0.2 part by weight |
| Zinc acrylate | 25 parts by weight |
| Dicumyl peroxide | 1.0 parts by weight |

Next, in each example, an intermediate layer material having the composition shown in Table 1 was mixed in a kneading-type twin-screw extruder at 200° C. to give a cover material in the form of pellets. The pelletized material was then extruded within a mold in which the above solid core had been placed, thereby producing a sphere having an intermediate layer of 1.5 mm thickness.

A cover composition of Himilan 1605 and Himilan 1706 (both trade names) blended in a 50:50 weight ratio was then injection-molded as the outermost layer (cover) material over the sphere, thereby producing a three-piece solid golf ball of the diameter and weight shown in Table 1.

The properties of the resulting golf balls in the respective examples and comparative examples were evaluated as described below. The results are presented in Table 1.

TABLE 1

|   |   | Example | | | Comparative Example | | |
|---|---|---|---|---|---|---|---|
|   |   | 1 | 2 | 3 | 1 | 2 | 3 |
| (a) | Polymer A | 50 | 10 | 20 | — | 50 | 100 |
| (b) | Polymer B | 50 | 90 | — | 100 | — | — |
| (b) | Polymer D | — | — | 80 | 100 | — | — |
| — | Polymer C | — | — | — | — | 50 | — |
| (c) | Magnesium stearate | 25 | 12 | 15 | 25 | 30 | 25 |
| (d) | Magnesium oxide | 3 | 3 | 3 | 3 | 3 | 3 |
| Material moldability | | good | good | good | good | good | NG |
| Shore D hardness of material | | 47 | 41 | 42 | 52 | 53 | 40 |
| Ball properties | Diameter (mm) | 42.72 | 42.73 | 42.71 | 42.73 | 42.76 | 42.73 |
|   | Weight (g) | 45.35 | 45.23 | 45.28 | 45.27 | 45.26 | 45.26 |
|   | 10-130 kgf deflection (mm) | 2.77 | 2.97 | 2.94 | 2.65 | 2.63 | 3.08 |
|   | Initial velocity (m/s) | 76.30 | 75.80 | 76.15 | 75.90 | 76.30 | 75.24 |
|   | Durability | good | good | good | NG | NG | good |

Ingredient amounts shown above are in parts by weight.

The materials in the above table are explained below.

Polymer A

Trade name: Nucrel N1050H

An un-neutralized ethylene-methacrylic acid binary copolymer (available from DuPont-Mitsui Polychemicals Co., Ltd.). Weight-average molecular weight (Mw), 61,000; molecular weight distribution (Mw/Mn), 6.13.

Polymer B

Trade name: Nucrel N0200H

An un-neutralized ethylene-methacrylic acid binary copolymer (available from DuPont-Mitsui Polychemicals Co., Ltd.). Weight-average molecular weight (Mw), 132,000; molecular weight distribution (Mw/Mn), 8.43.

Polymer D

Trade name: Nucrel AN4318

An un-neutralized ethylene-methacrylic acid-unsaturated carboxylic acid ester ternary copolymer (available from DuPont-Mitsui Polychemicals Co., Ltd.). Weight-average molecular weight (Mw), 183,000; molecular weight distribution (Mw/Mn), 6.14.

Polymer C

Trade name: Nucrel

An un-neutralized ethylene-methacrylic acid-unsaturated carboxylic acid ester ternary copolymer (available from DuPont-Mitsui Polychemicals Co., Ltd.). Weight-average molecular weight (Mw), 127,000; molecular weight distribution (Mw/Mn), 4.37.

The molecular weights and molecular weight distributions of each of the above polymers were determined by measurement using gel permeation chromatography (GPC), followed by calculation of the polystyrene-equivalent values.

Magnesium Stearate

Available under the trade name Magnesium Stearate G from NOF Corporation.

The physical properties of the golf ball materials and the golf balls were measured as follows.

Material Moldability

Golf ball materials which had a melt flow rate, as measured in accordance with JIS-K 7210 at a temperature of 190° C. and a load of 21.18 N (2.16 kgf), within a range of from 3 to 10 g/10 min were rated as "good," and materials which had a melt flow rate outside of this range were rated as "NG."

Shore D Hardness of Material

The composition was molded into sheets having a thickness of 2 mm, three such sheets were stacked together, and the hardness was measured with a Shore D durometer.

Deflection (mm)

The golf ball was placed on a steel plate and the deflection (mm) by the ball when compressed under a final load of 1,275 N (130 kgf) from an initial load of 98 N (10 kgf) was measured. This test was carried out at 23±1° C.

Initial Velocity (m/s)

The initial velocity of the ball was measured using an initial velocity measuring apparatus of the same type as the USGA drum rotation-type initial velocity instrument approved by the R&A. The ball was held isothermally at a temperature of 23±1° C. for at least 3 hours, then tested at the same temperature. The ball was hit using a 250-pound (113.4 kg) head (striking mass) at an impact velocity of 143.8 ft/s (43.83 m/s). Ten balls were each hit twice. The time taken by the ball to traverse a distance of 6.28 ft (1.91 m) was measured and used to compute the initial velocity of the ball. This cycle was carried out over a period of about 15 minutes.

Durability on Repeated Impact

The durability of the golf ball was evaluated using an ADC Ball COR Durability Tester produced by Automated Design Corporation (U.S.). The ball was fired using air pressure and made to consecutively strike two metal plates arranged in parallel. Using the average number of shots required for the ball to crack, the durability was rated according to the criteria indicated below. (Average values were obtained by furnishing four balls of the same type for testing, repeatedly firing each of the four balls until it cracked, and averaging the number of shots required for the respective balls to crack. The type of tester used was a vertical COR durability tester, and the incident velocity of the balls on the metal plates was 43 m/s.)

Good: More than 150 shots

Fair: 100 to 150 shots

NG: Less than 100 shots

As is apparent from the results in Table 1 above, the golf balls obtained in Comparative Examples 1 to 3 had the following drawbacks.

In Comparative Example 1, component (b) was used alone as the base resin, and the material hardness was high. Compared with Examples 1 and 2 according to the invention, the ball had a lower rebound and a poor durability.

In Comparative Example 2, two different types of copolymers were used, but a polymer which did not satisfy the component (a) and component (b) conditions was used as Polymer C. The material hardness was high and, compared with Examples 1 and 2 of the invention, the ball had a lower initial velocity and a lower durability.

In Comparative Example 3, component (a) was used alone as the base resin. The flowability was too high, resulting in a poor moldability. In addition, the golf ball material did have a lower hardness, but the initial velocity of the ball was much lower than in the examples according to the invention.

The invention claimed is:

1. A golf ball material which is a resin mixture comprising:
  (a) an olefin-unsaturated carboxylic acid copolymer and/or an olefin-unsaturated carboxylic acid-unsaturated carboxylic acid ester copolymer having a weight-average molecular weight (Mw) of from 40,000 to 80,000 and a weight average molecular weight (Mw) to number-average molecular weight (Mn) ratio of from 5.0 to 8.0, or a metal neutralization product thereof,
  (b) an olefin-unsaturated carboxylic acid copolymer and/or an olefin-unsaturated carboxylic acid-unsaturated carboxylic acid ester copolymer having a weight-average molecular weight (Mw) of from 120,000 to 200,000 and a weight-average molecular weight (Mw) to number-average molecular weight (Mn) ratio of from 6.0 to 9.5, or a metal neutralization product thereof, (c) an organic acid or a metal salt thereof, and
(d) a basic inorganic metal compound for neutralizing at least 70 mol % of acid groups in components (a) to (c); wherein the resin mixture has a Shore D hardness of from 30 to 50.

2. The golf ball material of claim 1 which has a mixing ratio by weight (a):(b) between component (a) and component (b) of from 10:90 to 70:30, and wherein component (c) is included in an amount of from 5 to 35 parts by weight per 100 parts by weight of components (a) and (b) combined.

3. The golf ball material of claim 1, wherein the organic acid of component (c) is selected from the group consisting of stearic acid, oleic acid, and mixtures thereof.

4. The golf ball material of claim 1, wherein the unsaturated carboxylic acid of components (a) and (b) is acrylic acid or methacrylic acid.

5. A method of preparing a gold ball material, the method comprising the step of preparing the golf ball material of claim 1 using a single-screw extruder, a twin-screw extruder, or a tandem extruder thereof.

6. The golf ball material of claim 1, wherein the component (b) is an olefin-unsaturated carboxylic acid-unsaturated carboxylic acid ester copolymer or a metal neutralization product thereof, and the unsaturated carboxylic acid ester is butyl acrylate.

7. The golf ball material of claim 1, wherein the olefin-unsaturated carboxylic acid used in both components (a) and (b) is methacrylic acid (MAA).

8. The golf ball material of claim 1, wherein the weight-average molecular weight (Mw) of component (a) is from 45,000 to 70,000, and the weight-average molecular weight (Mw) to number-average molecular weight (Mn) ratio is from 5.5 to 7.0.

9. The golf ball material of claim 1, wherein the weight-average molecular weight (Mw) of component (b) is from 120,000 to 180,000, and the weight-average molecular weight (Mw) to number-average molecular weight (Mn) ratio is from 6.1 to 8.5.

10. The golf ball material of claim 1, wherein the metal ion in the basic inorganic metal compound of component (d) is magnesium ion ($Mg^{2+}$).

* * * * *